US012605961B2

(12) United States Patent
Yada

(10) Patent No.: US 12,605,961 B2
(45) Date of Patent: Apr. 21, 2026

(54) WHEEL AND METHOD FOR MAKING WHEEL

(71) Applicant: HONDA MOTOR CO., LTD., Tokyo (JP)

(72) Inventor: Wataru Yada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 745 days.

(21) Appl. No.: 17/802,222

(22) PCT Filed: Mar. 18, 2020

(86) PCT No.: PCT/JP2020/012078
§ 371 (c)(1),
(2) Date: Aug. 25, 2022

(87) PCT Pub. No.: WO2021/186634
PCT Pub. Date: Sep. 23, 2021

(65) Prior Publication Data
US 2023/0084945 A1 Mar. 16, 2023

(51) Int. Cl.
*B60B 19/00* (2006.01)
*B60B 19/12* (2006.01)
(Continued)

(52) U.S. Cl.
CPC ............ *B60B 19/003* (2013.01); *B60B 19/12* (2013.01); *B60B 2310/211* (2013.01);
(Continued)

(58) Field of Classification Search
CPC ..... B62K 1/00; B60L 50/52; B60B 2310/211; B60B 2310/228
(Continued)

(56) References Cited

U.S. PATENT DOCUMENTS 7,552,977 B2 * 6/2009 Lamprich ............ A61G 5/1008
301/5.23
8,499,864 B2 * 8/2013 Takenaka ............. B62K 11/007
180/21
(Continued)

FOREIGN PATENT DOCUMENTS

CN 207644067 U 7/2018
GB 2338767 A * 12/1999 ............. F16D 23/14
(Continued)

OTHER PUBLICATIONS

International Search Report for Patent Application PCT/JP2020/012078 mailed May 19, 2020; 2 pp.
(Continued)

*Primary Examiner* — S. Joseph Morano
*Assistant Examiner* — Eva L Comino
(74) *Attorney, Agent, or Firm* — Armstrong Teasdale LLP

(57) ABSTRACT

A wheel (3) includes a core member (32) consisting of a tubular member (140) formed with a plurality of V-shaped notches (142) on one side thereof, and bent into an annular shape so as to close the notches, and a plurality of free rollers (60) each rotatably fitted on a linear section (120) of the tubular member located between a mutually adjoining pair of the V-shaped notches via a bearing (122) provided with an inner race (124) and an outer race (126), wherein a raised piece (130) is provided for each inner race on another side of the tubular member opposite from the one side as well as a protrusion (138) so as to engage an end surface of the inner race and fixedly secure the inner race to the core member.

4 Claims, 9 Drawing Sheets

(51) Int. Cl.
    *B60L 50/52*           (2019.01)
    *B62K 1/00*           (2006.01)

(52) U.S. Cl.
    CPC ......... *B60B 2310/228* (2013.01); *B60L 50/52*
                (2019.02); *B62K 1/00* (2013.01)

(58) Field of Classification Search
    USPC ....................................................... 301/5.23
    See application file for complete search history.

(56)           References Cited

U.S. PATENT DOCUMENTS

| | | | | |
|---|---|---|---|---|
| 8,827,375 | B2 * | 9/2014 | Takenaka | B62K 1/00 |
| | | | | 301/5.23 |
| 9,919,557 | B2 * | 3/2018 | Yoshino | B62K 11/007 |
| 2004/0004390 | A1 | 1/2004 | Guile | |
| 2010/0096905 | A1 * | 4/2010 | Takenaka | B62K 1/00 |
| | | | | 301/5.1 |
| 2011/0067937 | A1 * | 3/2011 | Gomi | B62K 11/007 |
| | | | | 180/21 |
| 2013/0133960 | A1 * | 5/2013 | Yada | B60B 19/003 |
| | | | | 180/21 |
| 2016/0023511 | A1 * | 1/2016 | Liddiard | B60B 19/003 |
| | | | | 301/5.23 |
| 2016/0303898 | A1 * | 10/2016 | Yoshino | B60B 19/003 |

FOREIGN PATENT DOCUMENTS

| | | | | | |
|---|---|---|---|---|---|
| JP | 2010006352 | A | | 1/2010 | |
| JP | 2013107575 | A * | 6/2013 | | B60B 19/003 |
| JP | 2016215960 | A * | 12/2016 | | B60B 19/12 |
| JP | 2017210035 | A | | 11/2017 | |
| JP | 2018122849 | A * | 8/2018 | | B60B 19/00 |
| JP | 2019182378 | A * | 10/2019 | | |
| WO | 2010064408 | A1 | | 6/2010 | |

OTHER PUBLICATIONS

Notification of First Office Action for Chinese Patent Application No. 202080097463.8; 13 pp.

\* cited by examiner

*Fig.3*

WHEEL AND METHOD FOR MAKING WHEEL

CROSS-REFERENCE TO RELATED APPLICATION

This application is a U.S. National Phase Application of PCT/JP2020/012078 filed Mar. 18, 2020. The contents of this application are hereby expressly incorporated by reference in their entirety.

TECHNICAL FIELD

The present invention relates to a wheel and a method for making a wheel.

BACKGROUND ART

For use in omnidirectional vehicles such as passenger vehicles, transport devices and robots, omni-wheels are known. A known omni-wheel includes an annular core member and a plurality of free rollers that are supported by the core member so as to be rotatable around the central line of the core member. See Patent Document 1, for instance.

According to this prior art, a plurality of inner sleeves (fixed members) each having a tubular shape are fitted on the core member in an immobile manner. To keep each inner sleeve immobile on the core member, the shape and dimensions of the inner sleeve are selected such that the inner sleeve is in contact with the radially outer part of the core member, and the radially inner parts of the core member at the two axial ends of the inner sleeve. Each free roller is supported by the core member so as to be rotatable around the circular axial line of the core member via a ball bearing including an inner race having an inner circumferential surface bonded to the outer circumferential surface of the inner sleeve, and an outer race freely rotatable relative to the inner race.

PRIOR ART DOCUMENT(S)

Patent Document(s)

Patent Document 1: JP2017-210035A

SUMMARY OF THE INVENTION

Task to be Accomplished by the Invention

Since the inner sleeve according to the prior art disclosed in Patent Document 1 is required to have an inner bore whose shape and dimensions are required to be precise, the machining of the inner sleeve is difficult. Therefore, the manufacturing cost of the inner sleeve becomes high, and the wheel requiring a large number of inner sleeves becomes prohibitively expensive.

In view of such a problem of the prior art, a primary object of the present invention to provide a wheel of an omni-wheel type which can be made at low cost, and a method for making such a wheel.

Means to Accomplish the Task

To achieve such an object, a certain aspect of the present invention provides a wheel (30), comprising: a core member (32) consisting of a tubular member (140) formed with a plurality of V-shaped notches (142) on one side thereof, and bent into an annular shape so as to close the notches; and a plurality of free rollers (60) each rotatably fitted on a linear section (120) of the tubular member located between a mutually adjoining pair of the V-shaped notches via a bearing (122) provided with an inner race (124) and an outer race (126), wherein a raised piece (130) is provided for each inner race on another side of the tubular member opposite from the one side so as to engage an end surface of the inner race and fixedly secure the inner race to the core member.

Thus, the inner races of the bearings are fixed to the core member by the raised pieces. As a result, the free rollers can be attached to the core member in such a manner that the free rollers are prevented from moving along the center line of the core member (hereinafter referred to as the revolving direction), and are freely rotatable around the center line. This eliminates the need for a separate fixing member (inner sleeve) for fixedly securing the inner race of each bearing to the core member so that the manufacturing cost of the wheel can be reduced.

Preferably, each raised piece extends from a tip end part of the corresponding V-shaped notch toward a side of the corresponding linear section as a cantilever.

As a result, the raised piece can be raised out of the outer peripheral surface of the linear section so that the movement of the free roller in the revolving direction can be restricted by the raised piece.

Preferably, the tubular member is provided with a pair of protrusions (138) in parts of the V-shaped notch which project toward each other on the one side of the tubular member, each protrusion providing a projecting part that projects from an outer peripheral surface of the linear section.

Thus, the movement of the inner race of each bearing in the revolving direction can be restricted by the protrusion as well. Thereby, the movement of the free roller in the revolving direction is more firmly restricted as compared with the case where the protrusions are not provided.

Preferably, each raised piece is incised such that bending the tubular member so as to close the V-shaped notch causes the raised piece to be raised.

As a result, the raised piece is caused to be automatically raised by bending the tubular member in such a manner that the movement of the free roller in the revolving direction is restricted. Therefore, no step is required to raise the raised piece in order to restrict the movement of the free roller in the revolving direction so that the wheel manufacturing process is simplified.

To achieve such an object, another aspect of the present invention provides a method for making a wheel (30), the wheel comprising: a core member (32) consisting of a tubular member (140) formed with a plurality of V-shaped notches (142) on one side thereof, and bent into an annular shape so as to close the notches; and a plurality of free rollers (60) each rotatably fitted on a linear section (120) of the tubular member located between a mutually adjoining pair of the notches via a bearing (122) provided with an inner race (124) and an outer race (126), the method comprising: a machining step for forming the V-shaped notches on the one side of the tubular member that extends linearly, and the raised pieces (130) on the other side of the tubular member opposite from the one side; and a positioning step for fitting the free rollers on the respective linear sections of the tubular member via the bearings; and a fixing step for bending the tubular member so as to close the V-shaped notches and turn the tubular member into the core member, and engaging the raised pieces with the end surfaces of the corresponding inner races.

Thus, the inner races of the bearings are fixed to the core member by the raised pieces. As a result, the free rollers can be attached to the core member in such a manner that the free rollers are prevented from moving along the center line of the core member (hereinafter referred to as the revolving direction), and are freely rotatable around the center line. This eliminates the need for a separate fixing member (inner sleeve) for fixedly securing the inner race of each bearing to the core member so that the manufacturing cost of the wheel can be reduced.

Preferably, each raised piece extends from a tip end part of the corresponding V-shaped notch toward the corresponding linear section as a cantilever.

As a result, the raised piece can be raised out of the outer peripheral surface of the linear section so that the movement of the free roller in the revolving direction can be restricted by the raised piece.

Preferably, in the fixing step, the raised pieces are automatically raised and brought into engagement with end surfaces of the corresponding inner races by bending the tubular member so as to close the V-shaped notches.

As a result, each raised piece is caused to be automatically raised by bending the tubular member in such a manner that the movement of the corresponding free roller in the revolving direction is restricted. Therefore, no step is required to raise the raised pieces in order to restrict the movement of the free rollers in the revolving direction so that the wheel manufacturing process is simplified.

Preferably, the fixing step includes a step for inserting a prescribed tool (156) into each V-shaped notch, and raising the corresponding raised piece into engagement with the end surface of the corresponding inner race.

Thereby, each raised piece can be raised into engagement with the inner race of the corresponding bearing so that the inner race of the bearing can be fixed to the core member.

Preferably, the machining step includes forming the V-shaped notches such that a pair of protrusions (138) are formed in parts of each V-shaped notch that oppose each other on the one side thereof and project toward each other, and the fixing step includes collapsing the protrusions so that the protrusions are each provided with a projecting part that projects outward from an outer peripheral surface of the corresponding linear section.

Thus, by engaging the protrusions with the inner races of the corresponding bearings, the inner races of the bearings can be fixed to the core member in an even more secure manner.

Effect of the Invention

The present invention thus provides a wheel of an omni-wheel type which can be made at low cost, and a method for producing such a wheel.

BRIEF DESCRIPTION OF THE DRAWING(S)

FIG. 1 is a perspective view of an inverted pendulum vehicle fitted with a wheel manufactured according to an embodiment of the present invention;

FIG. 2 contains (A) a perspective view of the wheel according to the present invention and (B) an enlarged view of the part in (A) surrounded by a double-dot chain line;

FIG. 3 is a sectional view taken along line III-III of FIG. 2;

DESCRIPTION OF THE PREFERRED EMBODIMENT(S)

An inverted pendulum vehicle fitted with a wheel manufactured according to an embodiment of the present invention will be described in the following with reference to the appended drawings.

First Embodiment

Figure 1:
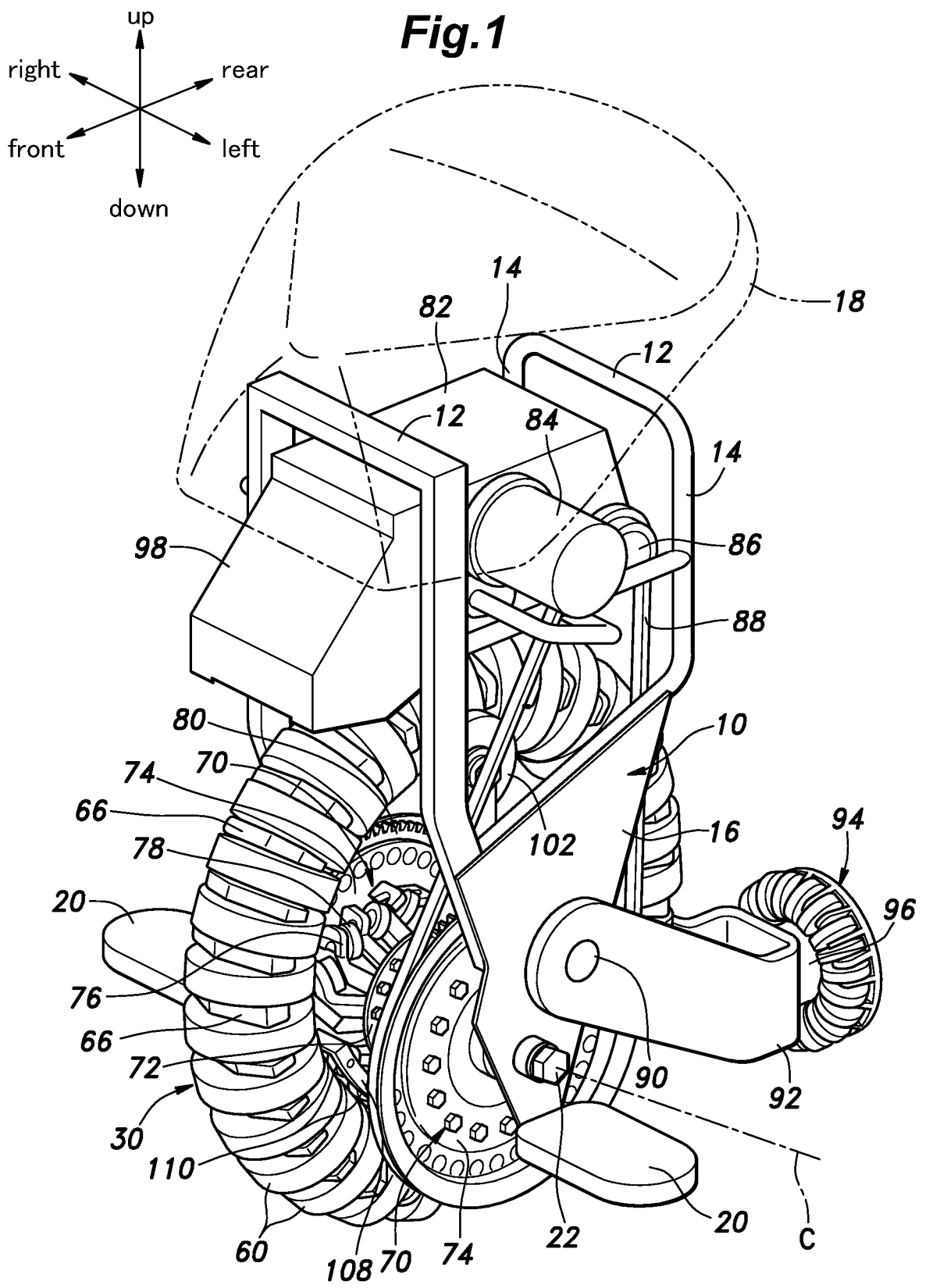

As shown in FIG. 1, the inverted pendulum type vehicle is one example of omnidirectional vehicles that can move both in the fore and aft and lateral directions, and is provided with a vehicle body frame 10 forming a vehicle body structure. The vehicle body frame 10 includes a pair of upper members one in the front and the other in the rear, two pairs of leg members 14 that depend downward from the left and right ends of the upper members 12, and a pair of lower support plates 16 provided on either side to connect the lower ends of the leg members 14 to each other on the corresponding sides. The upper parts of the upper members 12 jointly support a saddle 18 configured to support the buttock of the occupant. The lower support plates 16 are each fitted with a footrest 20 for supporting the corresponding foot of the occupant.

A main wheel 30 (wheel) and a left and a right drive disk 70 are arranged between the left and right leg members 14 and between the lower support plates 16. The main wheel 30 is a driven wheel, and is grounded to support the occupant seated on the saddle 18. The left and right drive disks 70 are arranged symmetrically on either side of the main wheel 30, and each consist of an assembly including a hub 72, a wheel disk 74, and a plurality of holders 76 arranged circumferentially at regular intervals and supported by the hub 72 and the wheel disk 74 at two ends thereof. Each drive disk 70 is supported by the vehicle body frame 10 via a support shaft 22 extending laterally so as to be rotatable around a central axial line extending substantially in the horizontal direction. More specifically, the vehicle body frame 10 supports the right and left drive disks 70 by the common support shaft 22 so as to be individually rotatable around a laterally extending, substantially horizontal central axial line.

Each drive disk 70 carries a plurality of drive rollers 78 arranged circumferentially at regular intervals via the respective holders 76. Each drive roller 78 is rotatable around a rotational axis which is skewed relative to the rotational axis (central axial line) of the drive disk 70. Only those drive rollers 78 located on the lower side are in contact with the outer circumferential surfaces of the free rollers 60 (driven rollers) of the main wheel 30 (which will be described hereinafter) located on the grounding side (lower side) of the main wheel 30 at the outer circumferential surfaces thereof (positioned on the radially inner side of the main wheel 30) from either side in a symmetric relationship.

The drive rollers 78 on the grounding side are pressed on the free rollers 60 of the main wheel 30 which are grounded under the loading of the occupant seated on the saddle 18 acting on the support shaft 22 via the vehicle body frame 10.

An hourglass-shaped regulating roller 102 is attached to the vehicle body frame 10 so as to be rotatable around an axis parallel to the central axis of the support shaft 22. The regulating roller 102 extends through an upper part of the main wheel 30 in the lateral direction, and an arcuate narrowed section of the regulating roller 102 is in contact with the outer circumferential surfaces (on the radially inner part of the main wheel 30) of the free rollers 60 located on the upper side of the main wheel 30 so that the main wheel 30 is prevented from tilting laterally or moving vertically relative to the vehicle body frame 10.

A plurality of regulating rollers 110 that roll over the outer peripheral surface of those free rollers 60 that are positioned in front of and behind those free rollers 60 that are grounded are mounted on a support member 108 in a concentrical arrangement around the support shaft 22 in a freely rotatable manner. The regulating rollers 110 contact the outer peripheral surface of the free rollers 60 so as to interpose the outer peripheral surface of the free rollers 60 (the radial inner outer peripheral surface of the main wheel 30) between the regulating rollers 110 from sideways. The regulating rollers 110 restrict the main wheel 30 from rotating around the vertical line passing through the ground contact point or the main wheel 30 from undergoing a yaw movement relative to the vehicle body frame 10 by contacting those free rollers that are located in front of and behind the vertical line passing through the grounding point. The regulating rollers 110 further restrict the main wheel 30 from undergoing a rolling movement and a pitching moment with respect to the vehicle body frame 10.

As described above, the lower part of the main wheel 30 is interposed between the left and right drive rollers 78 and between the left and right regulating rollers 110 along the axial direction while the upper part of the main wheel 30 is supported by the regulating roller 102 so that the main wheel 30 maintains an upright posture such that the central axial line thereof extends substantially horizontally under the inverted pendulum control.

Each drive disk 70 is concentrically fitted with a driven pulley 80. A part of the vehicle body frame 10 located above the main wheel 30 is provided with a gear box 82 mounted above the main wheels 30. Each side wall of the gear box 82 is provided with an electric motor 84 (only the electric motor for the left drive disk 70 is shown in FIG. 1) and a drive pulley 86 (only the drive pulley for the left drive disk 70 is shown in FIG. 1). The gear box 82 is internally provided with a reduction gear unit (not shown in the drawings) which transmits the rotation of the left and right electric motors 84 to the left and right drive pulleys 86 individually and at reduced speeds. An endless cogged belt 88 (only the cogged belt for the drive disk 70 on the left side is shown in FIG. 1) is passed around between each drive pulley 86 and the corresponding driven pulley 80. As a result, the left and right drive disks 70 can be individually rotated and driven.

A tail wheel support arm 92 is pivotally connected to the lower support plate 16 via a support shaft 90 at the base end thereof. The tail wheel support arm 92 extends rearward from the base end away from the main wheel 30, and is pivotable in a substantially vertical direction with respect to the vehicle body frame 10 around the central axis of the support shaft 90. The tail wheel support arm 92 supports an omni-wheel type tail wheel 94 (secondary wheel) at the free end so as to be rotatable around a substantially horizontal central axis orthogonal to the rotational center line of the drive disk 70. The tail wheel 94 is rotationally driven by an electric motor 96 mounted on the tail wheel support arm 92.

An electric box 98 is attached to a front part of the gear box 82. The electric box 98 contains an electronic control unit, a gyro sensor, a motor drive unit, and the like. The electronic control unit controls the left and right electric motors 84 so that the vehicle body frame 10 maintains a substantially upright posture by means of an inverted pendulum control process, and also controls the electric motor 96 for turning maneuver. Although not shown in the drawings, the vehicle body frame 10 is equipped with a battery that powers these electrical components.

When the left and right electric motors 84 are driven in the same direction and at the same speed, the left and right drive disks 70 rotate in the same direction at the same speed with the result that the main wheel 30 rotates around the rotational center line coinciding with the center of the annular configuration thereof. At such a time, since there is no difference in rotational speed between the left and right drive disks 70, the free rollers 60 of the main wheel 30 do not rotate so that the inverted pendulum type vehicle travels straight either forward or backward.

When the left and right electric motors 84 are driven in different rotational directions and/or at different rotational speeds, the rotational speed difference that occurs between the left and right drive disks 70 creates a component of force which is orthogonal to the circumferential (tangential) force acting on the contact surface between the drive rollers 78 of the left and right drive disks 70 and the free rollers 60 of the main wheel 30. As a result, the free rollers 60 rotate around the respective central axial lines thereof.

Since the rotation of the free rollers 60 is determined by the difference in rotational speed between the left and right drive disks 70, when the left and right drive disks 70 are rotated in opposite directions at the same speed, the main wheel 30 does not revolve at all and only the free rollers 60 rotate around themselves. As a result, a traveling force in the lateral direction is applied to the main wheel 30, and the inverted pendulum type vehicle travels in the lateral direction (moves sideways). When the left and right drive disks 70 are rotated in the same direction at different speeds, the free rollers 60 rotate around themselves while the main wheel 30 revolves around itself so that the inverted pendulum type vehicle travels obliquely forward or backward.

When the tail wheel 94 is rotationally driven by the electric motor 96, the inverted pendulum type vehicle turns around the ground contact point of the main wheel 30. Thus, the tail wheel 94 functions as a wheel for steering the inverted pendulum type vehicle. When the main wheel 30 and the tail wheel 94 are rotationally driven at the same time, the turning or cornering center of the vehicle moves according to the mode of driving the wheels.

Figure 2:
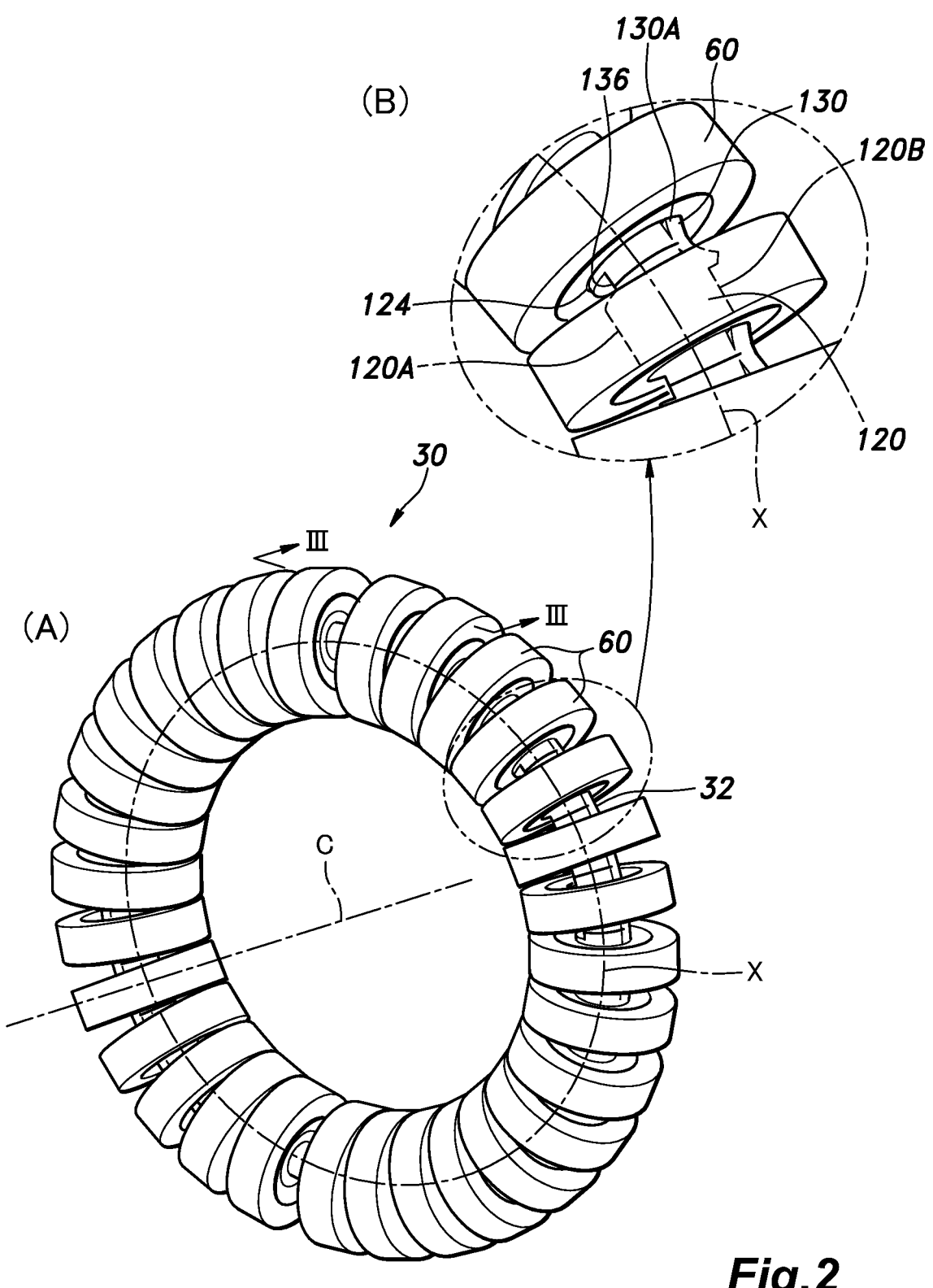
Figure 3:
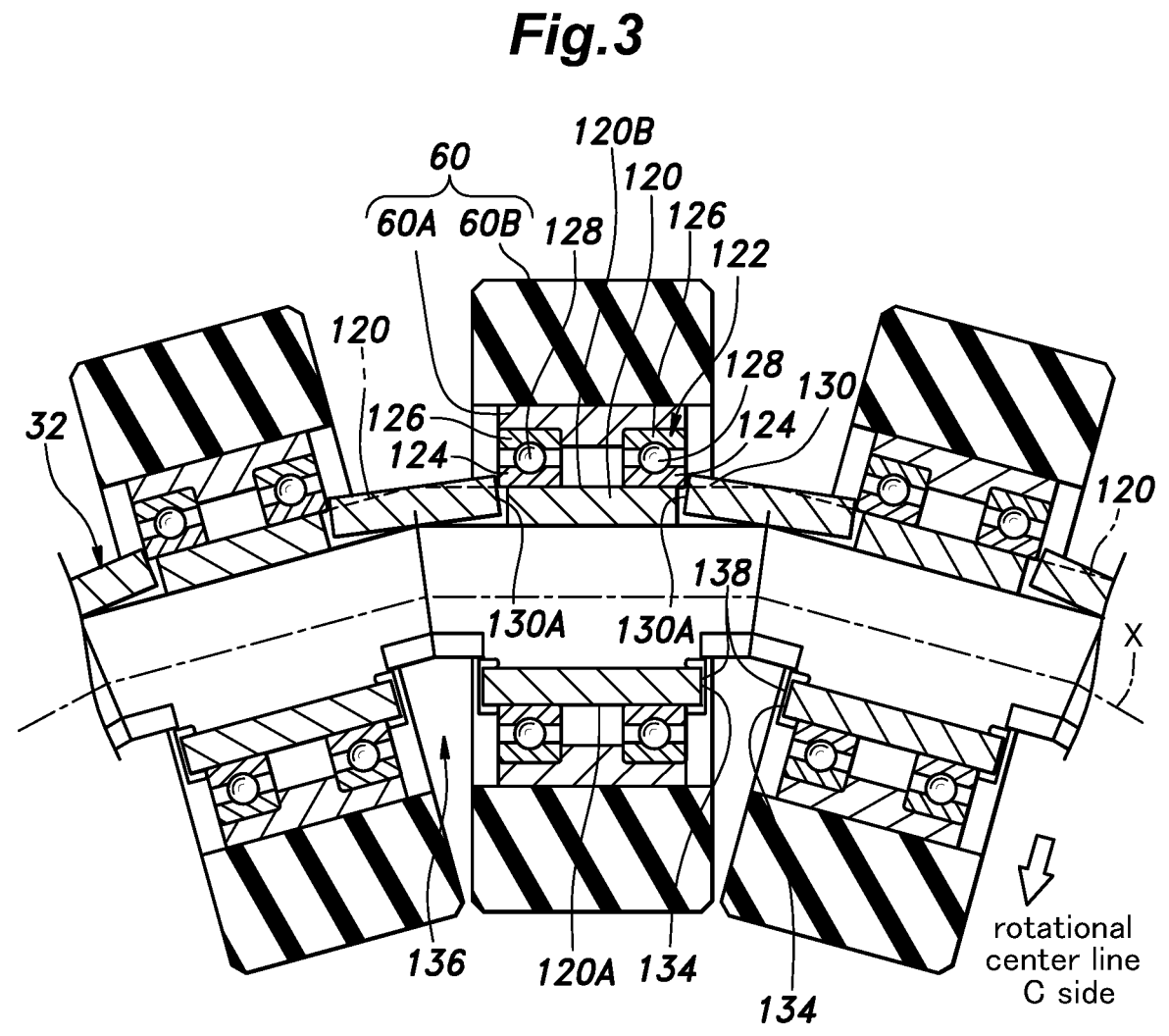

Next, the details of the main wheel 30 according to the present embodiment will be described in the following with reference to the drawings. As shown in FIG. 2A, the main wheel 30 has a core member 32 which has a regular polygonal ring shape centered on the rotational center line C of the main wheel 30. As shown in FIG. 3, the core member 32 is composed of a plurality of cylindrical linear sections 120 (linear parts) having an identical configuration. The linear sections 120 each extend linearly and are connected to each other at the two ends thereof. Hereinafter, for convenience of explanation, the line connecting the center points of the cross sections of the linear section 120 will be referred to as an annular center line X, and the direction along the annular center line X will be referred to as a revolving direction.

As shown in FIGS. 2A and 2B, the free rollers 60 are provided on the outer peripheral surface of the linear sections 120, respectively. As shown in FIG. 3, each free roller 60 includes a cylindrical inner member 60A and an outer member 60B which is coaxial with the inner member 60A and joined to the outer peripheral surface of the inner member 60A. The inner member 60A is made of a metal such as stainless steel, and the outer member 60B is made of synthetic resin such as rubber.

As shown in FIG. 3, the linear sections 120 are passed through the inner bores of the corresponding free rollers 60. A ball bearing 122 (bearing) is provided between each linear section 120 and the corresponding free roller 60 so that the free roller 60 is freely rotatably fitted on the core member 32 via the ball bearing 122.

Each ball bearing 122 has an inner race 124, an outer race 126, and a plurality of rolling elements 128 interposed between the inner race 124 and the outer race 126. The inner race 124 is an annular metal member, and the core member 32 (linear section 120) is passed through the inner bore thereof. The outer race 126 is also an annular metal member which surrounds coaxially the inner race 124. The rolling elements 128 may consist of spherical metal members, and are in contact with the outer peripheral surface of the inner race 124 and the inner peripheral surface of the outer race 126. As a result, the outer race 126 can rotate with respect to the inner race 124 about the center line of the inner race 124.

The inner bore of each free roller 60 is fitted with the corresponding ball bearing 122 in a coaxial relationship, and the outer peripheral surface of the ball bearing 122 (that is, the outer peripheral surface of the outer race 126 thereof) is bonded to the inner peripheral surface of the free roller 60 by in situ vulcanization of rubber so that the free roller 60 can rotate about the axis of the inner race 124 with respect to the inner race 124 of the ball bearing 122.

As shown in FIG. 2B, each linear section 120 has a cylindrical shape extending along the annular center line X. Hereinafter, a part of each linear section 120 having a surface facing the rotational center line C of the linear section 120 and being closest to the rotational center line C is referred to as an inner side end part 120A. A part of each linear section 120 having a surface facing away from the rotational center line C of the linear section 120 and being remotest from the rotational center line C is referred to as an outer side end part 120B.

The outer side end part 120B of each linear section 120 is provided with a pair of raised pieces 130. Each raised piece 130 extends from an end part of the linear section 120 inward along the length of the linear section 120 as a cantilever beam, and is raised away from the rotational center line C.

As shown in FIG. 3, the free end 130A of each raised piece 130 abuts on the end face of the inner race 124 from the axial direction so as to prevent the movement of the inner race 124 along the length of the linear section 120, and the rotation of the inner race 124 around the axis of the linear section 120. Thus, the inner race 124 is fixedly secured to the core member 32. In this way, each free roller 60 is supported by the core member 32 so as to be rotatable around the annular center line X with the inner race 124 fixed to the core member 32, and the free roller 60 bonded to the outer race 126.

Each axial end of the inner side end part 120A of the linear section 120 is provided with a cutout 134 which is cut into the inner side end part 120A of the linear section 120 from the axial end thereof in a substantially rectangular shape. Each cutout 134 defines a substantially rectangular through hole 136 communicating with the inner bore of the core member 32 in cooperation with the identical cutout 134 formed in the adjoining linear section 120.

As shown in FIG. 2B, the through hole 136 is formed so as to straddle the ends of the two linear sections 120 when viewed from a directional orthogonal to the rotational center line C. Each through hole 136 may overlap with the raised pieces 130 provided at the opposing ends of the two corresponding linear sections 120 when viewed from a directional orthogonal to the rotational center line C.

The wall surface defining the through hole 136 is provided with a pair of protrusions 138 that project toward each other in the revolving direction. The protrusions 138 are each bent toward the rotational center line C. A part of each protrusion 138 is located on the side of the rotational center line C with respect to the outer surface of the inner side end part 120A of the linear section 120. As a result, each protrusion 138 includes a part that protrudes outward (toward the rotational center line C) from the outer peripheral surface of the linear section 120.

Each of the protrusions 138 is in contact with the axial end face of the corresponding inner race 124. As a result, the inner race 124 is prevented from moving along the lengthwise direction of the linear section 120, and from rotating around the central axial line of the linear section 120. Therefore, the bonding force between the inner race 124 and the core member 32 is made even more stronger as compared with the case where only the raised pieces 130 are employed so that the rattling of the free rollers 60 can be minimized.

Next, a method for manufacturing the main wheel 30 will be described in the following with reference to FIGS. 4 to 9. The manufacturing method is composed of a number of manufacturing steps including a machining step, a positioning step, and a fixing step. The machining step consists of forming a prepared tubular member 140 extending linearly into a predetermined shape. The positioning step consists of fitting the free rollers 60 to the machined tubular member 140 via the ball bearings 122. The fixing step consists of bending the tubular member 140 into a regular polygonal annular shape to form it into the core member 32, and fixing the inner races 124 of the ball bearings 122 onto the core member. In the following, each of the machining step, the positioning step, and the fixing step will be described in more detail.

Figure 4:
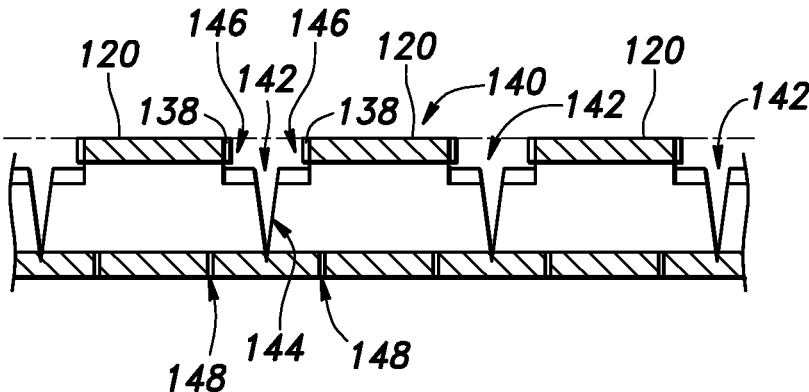
FIG. 4 is a sectional view of a tubular member taken along the length thereof.
Figure 5:
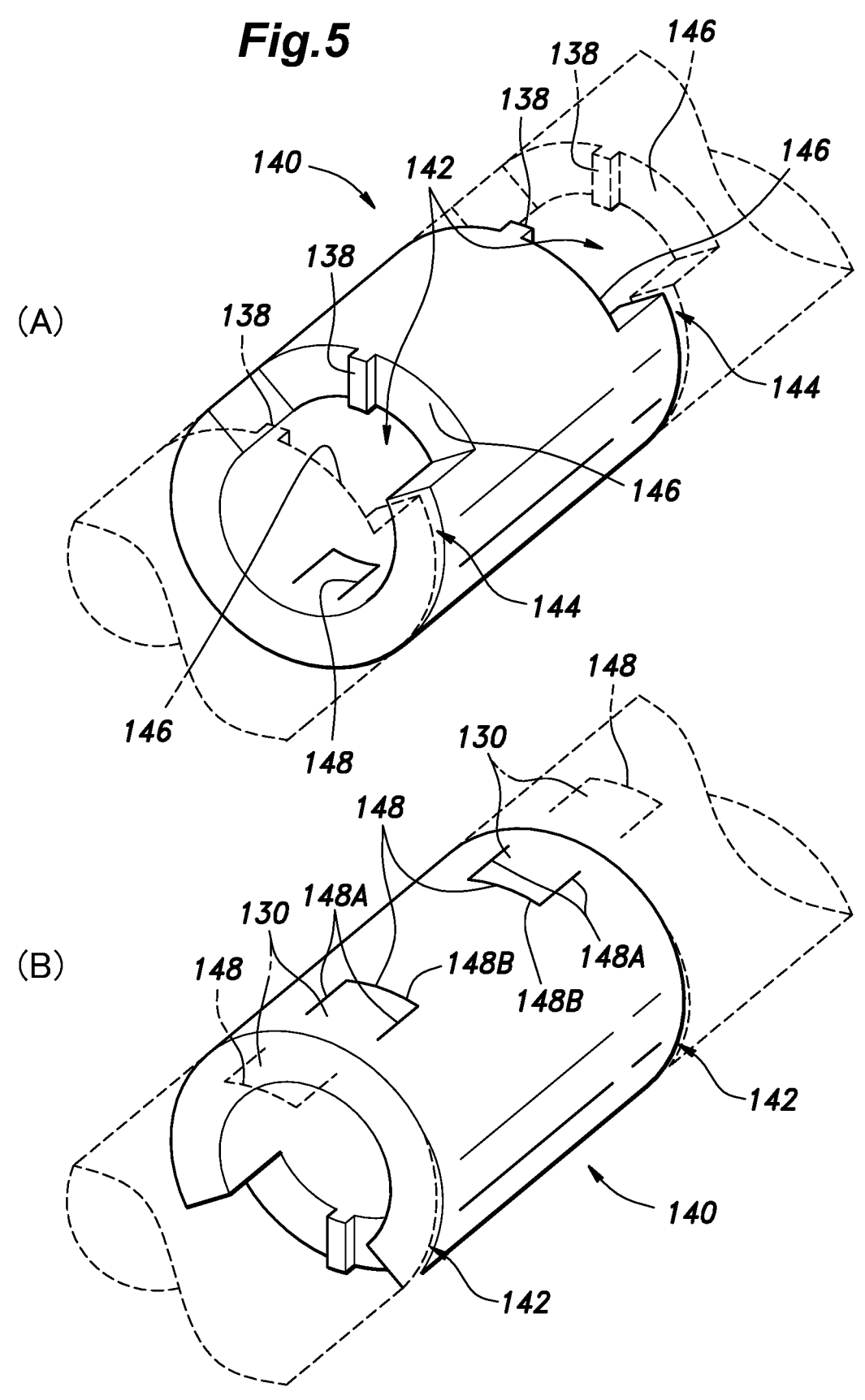
FIG. 5A is a perspective view of the tubular member as seen from above.
FIG. 5B is a perspective view of the tubular member as seen from below.

In the machining step, an operator first prepares a tubular member 140 extending linearly. The tubular member 140 is a cylindrical metal member, and in this embodiment, consists of a stainless steel round pipe. More specifically, in the machining step, after fixing the tubular member 140, the operator operates a machine tool to form a plurality of V-shaped notches 142 arranged along the lengthwise direction of the tubular member 140 at regular intervals on the upper surface (one side surface) of the tubular member 140 as shown in FIGS. 4 and 5A. The machine tool may consist of any device that can cut or machine a workpiece, and consists of a laser cutting machine in this embodiment.

As shown in FIG. 5A, each V-shaped notch 142 includes a pair of wedge portions 144 cut downward from the upper surface of the tubular member 140 on either side thereof and a pair of extensions 146 provided on the upper surface side of the wedge portions 144. The wedge portions 144 have a wedge shape in side view (horizontal view). The extensions 146 are formed by cutting the tubular member 140 from the upper surface side of the wedge portions 144 in a rectangular shape away from each other in the lengthwise direction of the tubular member 140. Each extension 146 has a substantially rectangular shape extending in the lengthwise direction away from the upper surface side of the wedge portions 144. The wall surface defining the inner end of each extension 146 opposes the counterpart of the adjacent extension 146 in the lengthwise direction. The wall surface defining the inner end of each extension 146 is provided with the protrusion 138 so as to oppose the counterpart in the adjacent extension 146.

Next, by operating the machine tool, the operator makes an incision 148 between the tip ends of each V-shaped notch 142 on the lower surface side of the tubular member 140 as shown in FIG. 5B. Each incision 148 forms a raised piece 130 consisting of a cantilever beam extending from the end of the incision 148 adjacent to the tip ends of the V-shaped notch 142 toward the other raised piece 130 formed on the other end of the same linear section 120. More specifically, each incision 148 formed in the tubular member 140 forms a raised piece 130. In the present embodiment, the incisions 148 extend along the lengthwise direction of the tubular member 140, and are each provided with a pair of longitudinal sections 148A extending in the circumferential direction next to each other, and a lateral section 148B circumferentially connecting the ends of the longitudinal sections 148A remote from the tip end portion of the corresponding V-shaped notch 142.

Once the forming of the V-shaped notches 142 and the incisions 148 are completed, the operator finishes the machining step and performs the positioning step.

Figure 6:
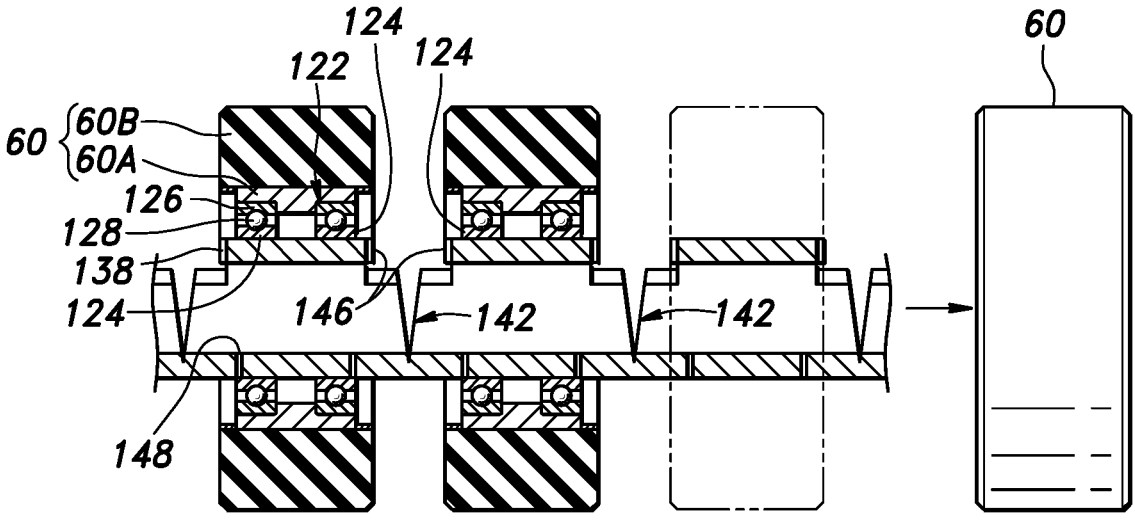
FIG. 6 is an explanatory view showing a positioning step.

In the positioning step, the operator prepares a plurality of ball bearings 122 to whose outer races 126 the free roller 60 are bonded in advance, and inserts the tubular member 140, which is already machined, into the inner bores of the inner races 124 as shown in FIG. 6. Thereafter, the operator positions the ball bearings 122 so that the inner races 124 are each located between the two adjoining V-shaped notches 142 of the tubular member 140. As a result, each free roller 60 is fitted to the part of the tubular member 140 located between the incisions 148 via the corresponding ball bearing 122. At this time, the axial end part of each extension 146 and the axial end part of the corresponding inner race 124 are preferably aligned with each other in top view.

Figure 7:
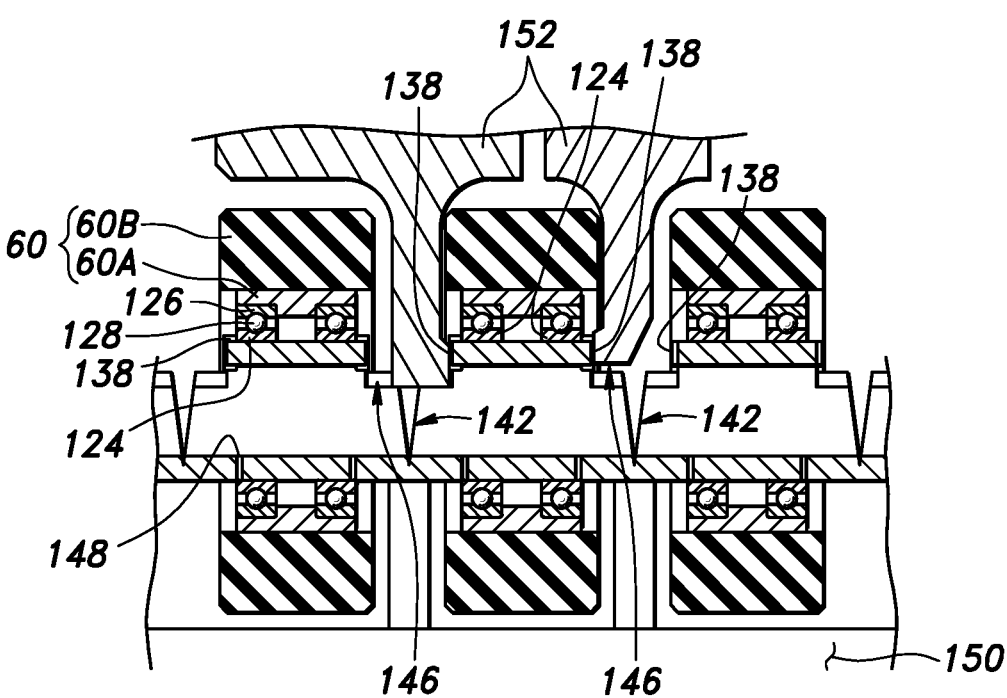
FIG. 7 is an explanatory view showing a crimping step.
Figure 8:
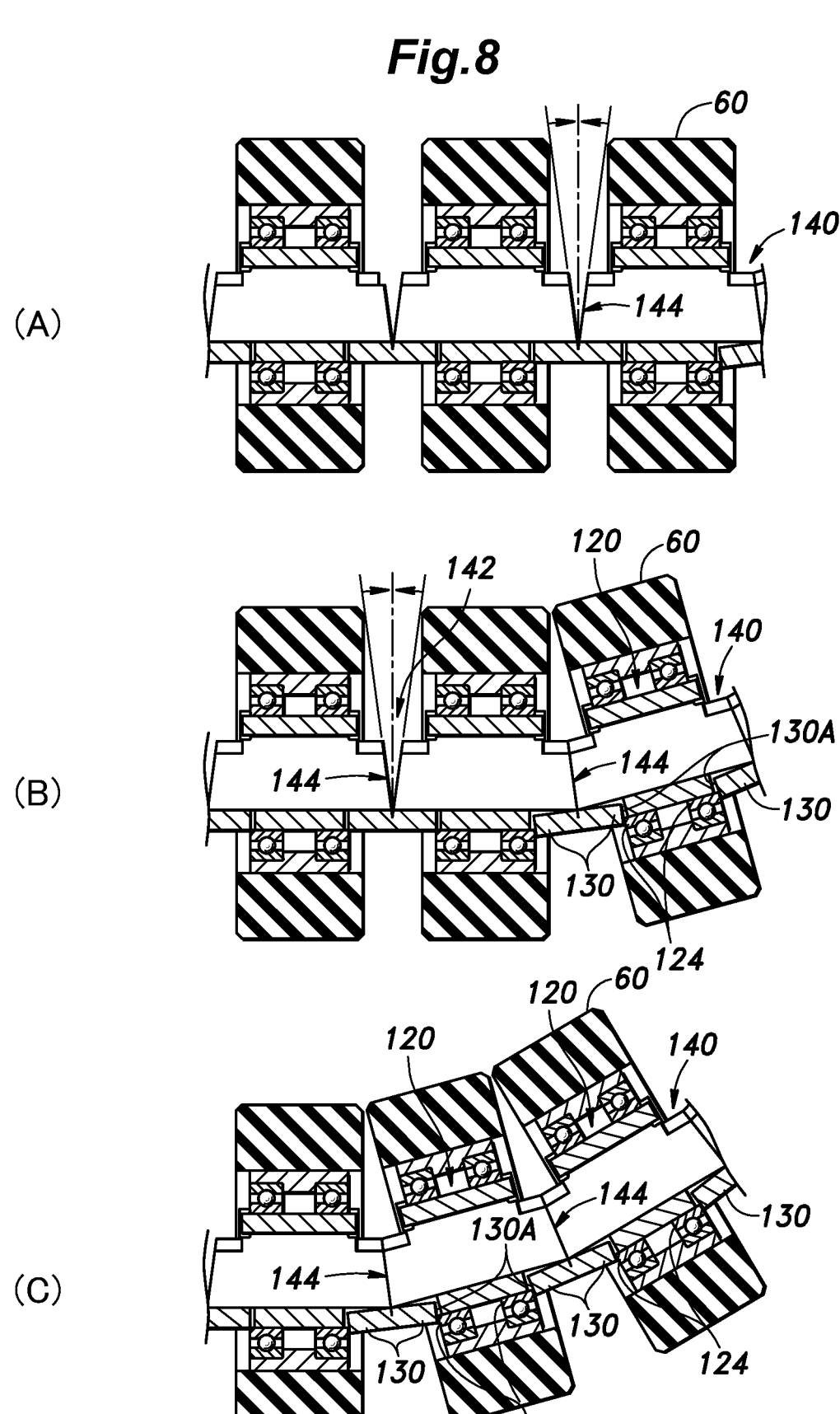
FIGS. 8A to 8C are explanatory views showing a fixing step in the method for making a wheel according to a first embodiment of the present invention.

Then, as shown in FIG. 7, the operator performs a crimping step by fixing the tubular member 140 to a prescribed support member 150, inserting a jig 152 (tool) into the extension 146, and applying a prescribed loading to the protrusion 138 to collapse the protrusion 138. The magnitude of the loading applied to the protrusion 138 is selected such that the free end of the protrusion 138 projects more outward than the part of the tubular member 140 on the upper side of the outer circumferential surface thereof located between the adjoining V-shaped notches 142. When collapsed in this manner, the protrusion 138 is brought into contact with the end surface and the corner part of the inner race 124. As a result, the movement of the inner race 124 along the lengthwise direction of the tubular member 140 is restricted, and the rotation of the tubular member 140 around the axial line thereof is restricted so that the inner race 124 is temporarily fixed to the tubular member 140. The protrusion 138 may be optionally brought into contact with the inner circumferential surface of the inner race 124.

Once the crimping step is performed and the temporary fixing of all the inner races 124 is completed, the operator has completed the position step, and proceeds to the fixing step.

In the fixing step, as shown in FIGS. 8A to 8C, the operator bends the tubular member 140 to which the inner races 124 have been temporarily fixed so as to form a regular polygonal shape centered on a predetermined axis. At this time, the operator keeps bending the tubular member 140 until the wedge portions 144 of the V-shaped notches 142 are closed, and the wall surfaces defining the wedge portion 144 come into contact with each other as shown by the arrows in FIGS. 8A and 8B. In this bending process, the parts of the tubular member 140 located between the V-shaped notches 142 are not substantially deformed, and maintain a straight shape so as to form the linear sections 120.

As the parts of the tubular member 140 located between the adjoining linear sections 120 are bent, the raised pieces 130 are caused to spontaneously rise up away from the inner bore of the tubular member 140, and protrude from the outer peripheral surface of the linear sections 120 (see FIGS. 8(B) and 8(C)). As a result, the raised pieces 130 abut on the end faces and the corner parts of the corresponding inner races 124 from the axial direction at the free ends 130A thereof with the result that the raised pieces 130 engage the corresponding inner races 124. Owing to the engagement between the inner races 124 and the raised pieces 130, the movement of the inner races 124 in the axial direction relative to the tubular member 140 as well as the rotation of the inner races 124 around the axis of the tubular member 140 is restricted with the result that the inner races 124 are fixedly secured to the tubular member 140.

Thereafter, the operator welds the ends of the tubular member 140 to each other, and then welds the wall surfaces defining the wedge portions 144 to each other so that the tubular member 140 is formed into the core member 32 and the main wheel 30 is completed.

Next, the effect of the main wheel 30 (wheel) configured as described above and the method for manufacturing the main wheel 30 will be discussed in the following. The inner race 124 of each ball bearing 122 is engaged by the corresponding raised pieces 130 and fixedly secured to the core member 32. In this way, the free rollers 60 can be attached to the core member 32 in such a manner that the movement in the revolving direction is restricted while rotation around themselves can be made freely.

Since each inner race 124 is fixed to the core member 32 by the corresponding raised pieces 130, any extra fixing members (such as inner sleeves) are not required for fixing the inner races 124 of the ball bearings 122. Therefore, the number of component parts constituting the main wheel 30 can be reduced, and the manufacturing cost of the main wheel 30 can be reduced.

The raised pieces 130 are located on the surface opposite to the side surface (upper surface) where the V-shaped notches 142 are provided, and are formed as cantilevers extending from the outside adjacent to the tip ends of the V-shaped notches 142 to the inside of the corresponding linear sections 120. As a result, when the tubular member 140 is bent so as to close the wedge portions 144 of the V-shaped notches 142, the raised pieces 130 are caused to spontaneously rise up way from the inner bore of the tubular member 140 until the end surfaces of the raised pieces 130 abut against the end surfaces of the corresponding inner races 124. As a result, the inner races 124 are automatically fixed to the core member 32. In this way, by bending the tubular member 140, the movement of the free rollers 60 in the revolving direction is automatically restricted. There-fore, no work step is required to raise up the raised pieces 130 in order to restrict the movement of the free rollers 60 in the revolving direction. Therefore, the manufacturing process for the main wheel 30 is simplified, and the manu-facturing cost of the main wheel 30 can be reduced.

In the positioning step, each inner race 124 is fixed to the tubular member 140 by collapsing and deforming the pro-trusions 138 so as to protrude from the outer peripheral surface of the linear section 120. Thus, according to the present embodiment, since each inner race 124 is fixed to the core member 32 by the protrusions 138 in addition to the raised pieces 130, the movement of the inner race 124 in the revolving direction can be prevented in a more secure manner as compared with the case where the protrusions 138 are not provided, and the free rollers 60 can be prevented from rattling.

Second Embodiment

The main wheel 30 of the second embodiment of the present invention is similar in structure to that of the first embodiment, and differs therefrom only in the manufactur-ing method therefor. Therefore, the method for manufactur-ing the main wheel 30 of the second embodiment will be described in the following.

The manufacturing method of the main wheel 30 accord-ing to the second embodiment is composed of a number of manufacturing steps including a machining step, a position-ing step, and a fixing step. The machining step and the positioning step of the second embodiment are similar to those of the first embodiment, and the second embodiment differs from the first embodiment only in the fixing step. The fixing step of the second embodiment will be described in detail in the following.

Figure 9:
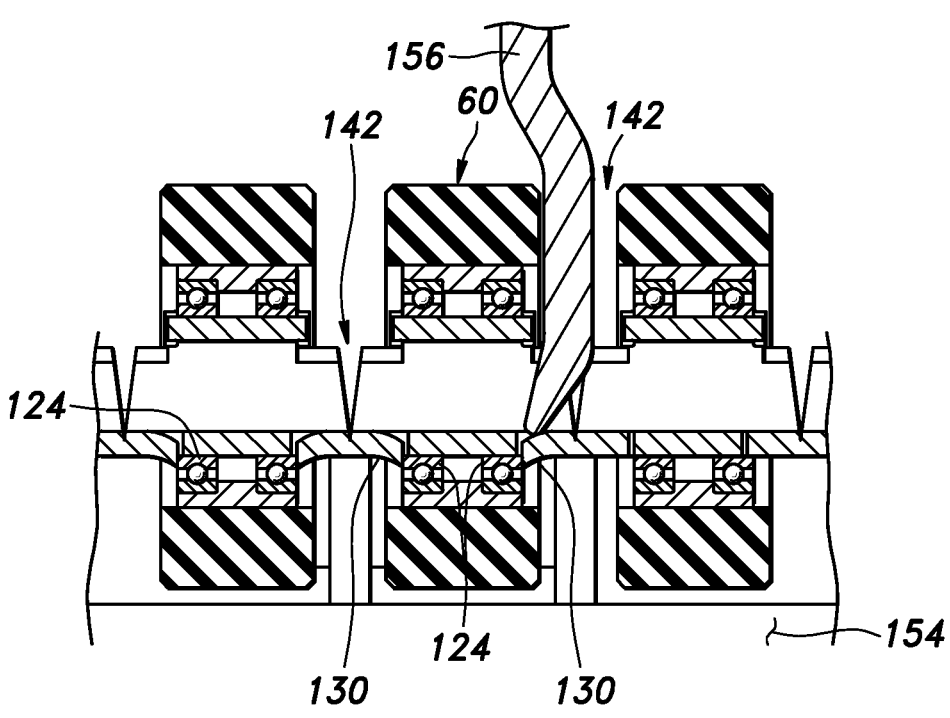
FIG. 9 is an explanatory view showing a fixing step in the method for making a wheel according to a second embodiment of the present invention.

Similar as in the first embodiment, the operator temporary fixes the inner races 124, and performs the fixing step. In the fixing step, as shown in FIG. 9, the operator fixes the tubular member 140 to a prescribed support member 154, and then inserts a prescribed jig 156 (tool) into each V-shaped notch 142 to raise up the raised piece 130. At this time, the operator raises each raised piece 130 to such an extent as to bring the raised piece 130 into contact with the end surface of the corresponding inner race 124. Once each raised piece 130 engages the end surface of the inner race 124, the inner race 124 is prevented from moving to the side of the raised piece 130.

In the fixing step, the operator inserts the jig 156 into the V-shaped notches 142 one after another to raise all the raised pieces 130. As a result, the inner races 124 are all fixed to the tubular member 140 by being locked by the raised pieces 130 from both sides in the axial direction.

Thereafter, as in the first embodiment, the operator tem-porarily joins the two ends of the tubular member 140 to each other by welding, and then welds the wall surface defining the wedge portions 144 to one another. Thus, the tubular member 140 is formed into the core member 32, and the main wheel 30 is completed.

Next, the effect of the manufacturing method of the main wheel 30 configured as described above will be discussed in the following. In the present embodiment, the raised pieces 130 can be raised in a more reliably manner by inserting the jig 156 into the V-shaped notches 142. Further, by adjusting the insertion stroke of the jig 156, the raised height of the raised pieces 130 can be adjusted. As a result, the inner races 124 and the raised pieces 130 can be reliably engaged with each other so that the inner races 124 can be securely fixed to the tubular member 140 (core member 32) in an even more reliable manner.

The present invention has been described in terms of specific embodiments thereof, but the present invention is not limited by such embodiments, and can be modified in various ways without departing from the scope of the present invention. In the foregoing embodiments, the ends of the inner races 124 along the revolution direction were each engaged by a single raised piece 130 to fixedly secure the inner races 124 to the core member 32, but the present invention is not limited by this arrangement. The ends of the inner races 124 along the revolution direction may also be each engaged by a plurality of raised pieces 130. Further, a single free roller 60 was provided for each linear section 120, but two or more free rollers 60 may be provided for each linear section 120.

| REFERENCE NUMERALS | |
| --- | --- |
| 30: main wheel (wheel) | 32: core member |
| 60: free roller | 120: linear section |
| 122: ball bearing (bearing) | 124: inner race |
| 126: outer race | 130: raised piece |
| 138: protrusion | 140: tubular member |
| 142: V-shaped notch | 156: jig (tool) |

The invention claimed is:

1. A wheel, comprising:
   a core member consisting of a tubular member with an annular shape; and
   a plurality of free rollers each rotatably fitted on a linear section of the tubular member via a bearing provided with an inner race and an outer race,
   wherein a raised piece is provided on a side of the tubular member away from the center of the annular shape, the raised piece being formed integrally with the tubular member and surrounded by a slit; and
   each raised piece protrudes from the side of the tubular member to engage an end surface of the corresponding inner race and fixedly secure the inner race to the core member.

2. The wheel according to claim 1, wherein a gap is formed between the slit and the raised piece, the gap defining a passage that leads to an inner bore of the tubular member.

3. The wheel according to claim 2, wherein the tubular member is provided with a pair of protrusions, each on opposing ends of adjacent tubular members, which project toward each other on each side of the tubular member, each protrusion providing a projecting part that projects from an outer peripheral surface of the linear section.

4. The wheel according to claim 1, wherein the slit is provided with a pair of longitudinal sections extending along the linear section of tubular member, and a lateral section connecting ends of the longitudinal sections.

* * * * *